United States Patent [19]

Takai et al.

[11] Patent Number: 4,672,478
[45] Date of Patent: Jun. 9, 1987

[54] LOADING AND EJECTION MECHANISM FOR TAPE PLAYER

[75] Inventors: Kazuki Takai; Shigeo Kinoshita; Toshihiko Fukazawa; Junichi Kikuchi, all of Tokyo, Japan

[73] Assignee: Clarion Co. Ltd., Tokyo, Japan

[21] Appl. No.: 686,285

[22] Filed: Dec. 26, 1984

[30] Foreign Application Priority Data

| Dec. 26, 1983 [JP] | Japan | 58-243697 |
| Dec. 28, 1983 [JP] | Japan | 58-247181 |
| Mar. 28, 1984 [JP] | Japan | 59-58405 |

[51] Int. Cl.⁴ ............................................. G11B 15/68
[52] U.S. Cl. ...................................... 360/93; 360/96.5
[58] Field of Search ................ 360/96.5, 93, 96.1, 360/90

[56] References Cited

U.S. PATENT DOCUMENTS

| 4,295,169 | 10/1981 | Iwata et al. | 360/93 |
| 4,337,487 | 6/1982 | Takai | 360/93 |
| 4,479,155 | 10/1984 | Takai et al. | 360/96.5 |
| 4,519,269 | 5/1985 | Itoh et al. | 360/96.1 |
| 4,532,563 | 7/1985 | Edakubo | 360/96.5 |
| 4,561,031 | 12/1985 | Tanabe | 360/96.5 |

FOREIGN PATENT DOCUMENTS 56-41553  4/1981  Japan ............................. 360/96.5

Primary Examiner—John H. Wolff
Assistant Examiner—Matthew J. Bussan
Attorney, Agent, or Firm—Russell E. Hattis; Stephen R. Arnold

[57] ABSTRACT

A loading and ejection mechanism includes an inversion gear rotated by a motor in the opposite directions, an eject plate having a rack engageable with the inversion gear, and a mechanism to bring the rack into engagement with the inversion gear, so that the eject plate is moved back and forth by rotation of the inversion gear during loading and ejection so as to move a pack guide up and down and move an eject arm back and forth.

2 Claims, 37 Drawing Figures

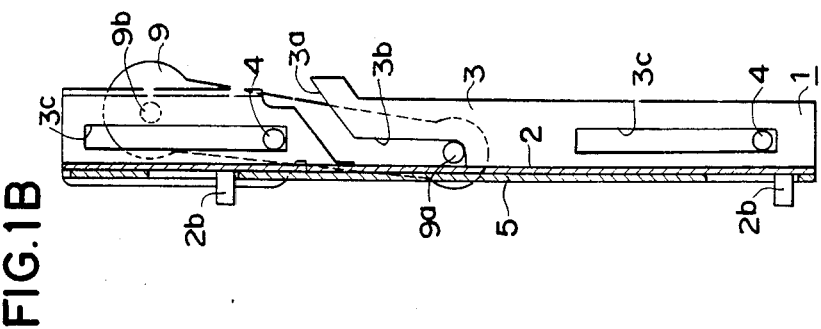
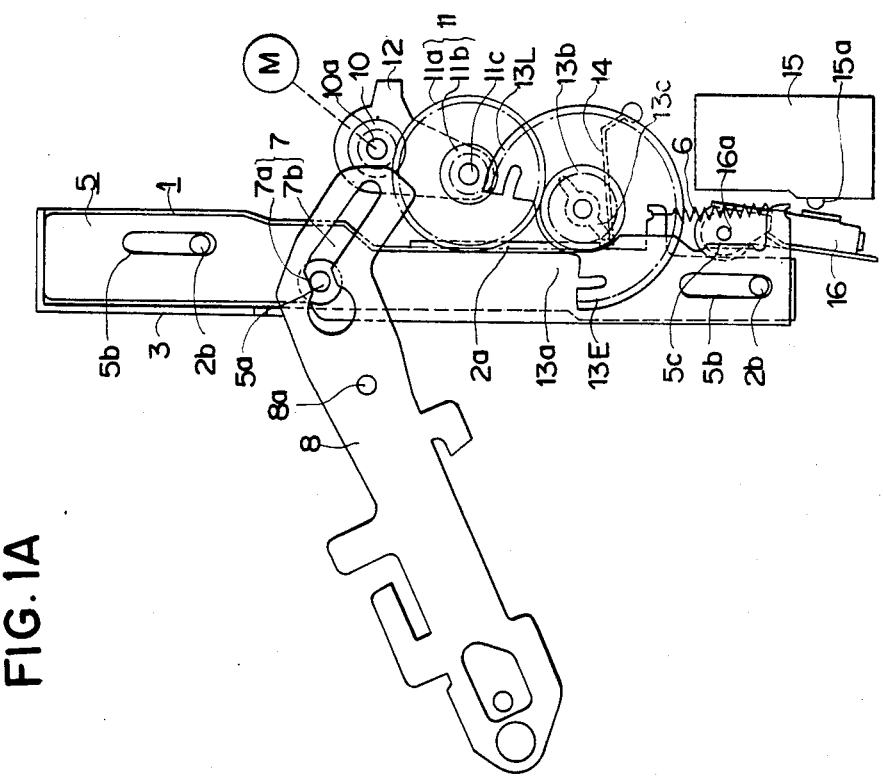
FIG.1B
FIG.1A

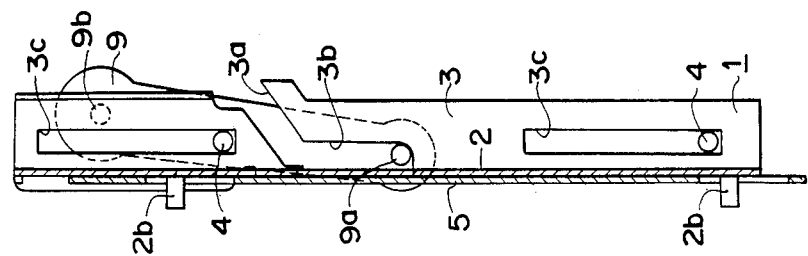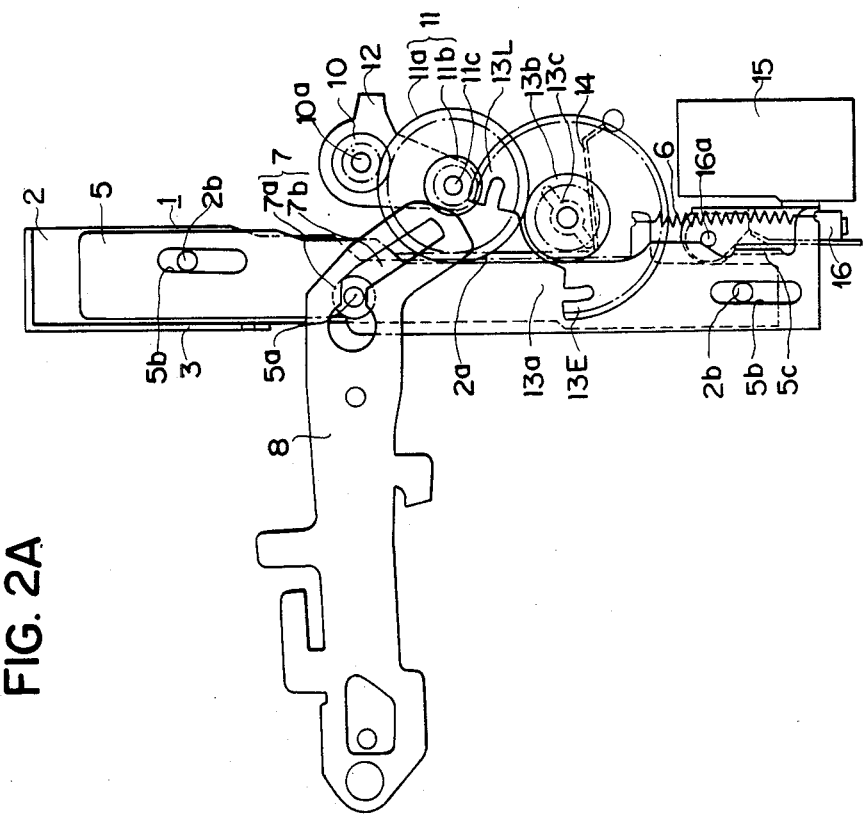

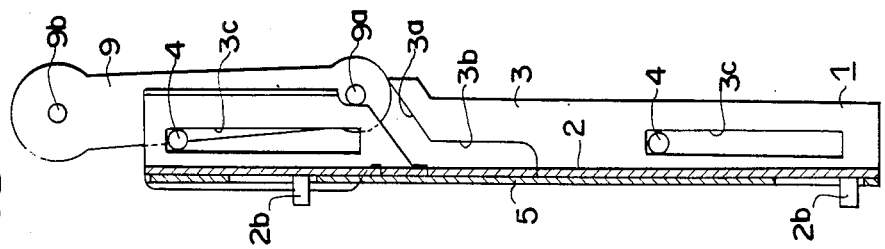
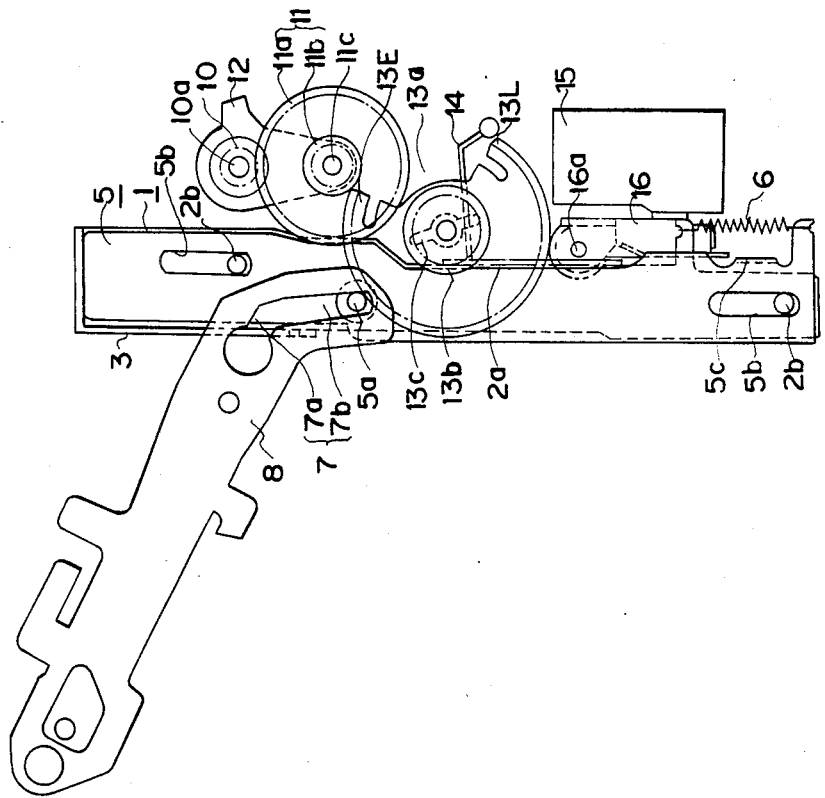
FIG. 6B
FIG. 6A

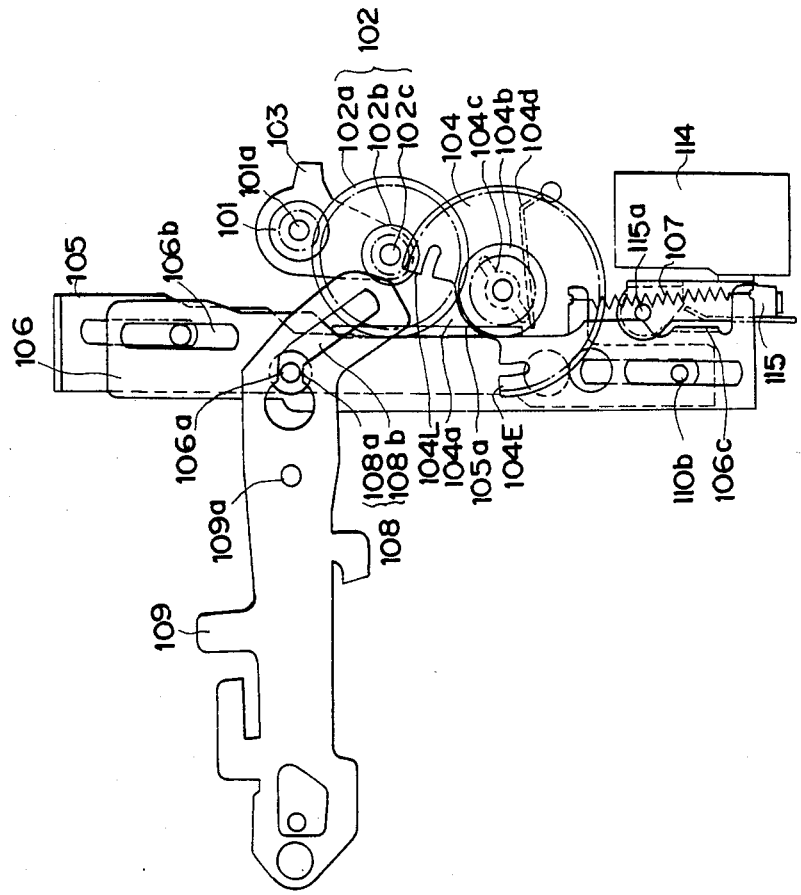

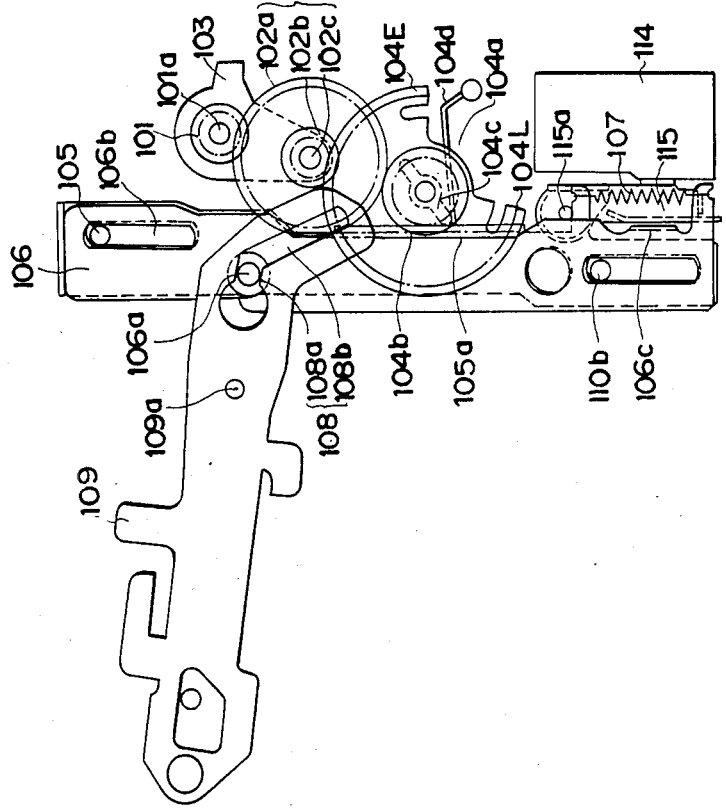

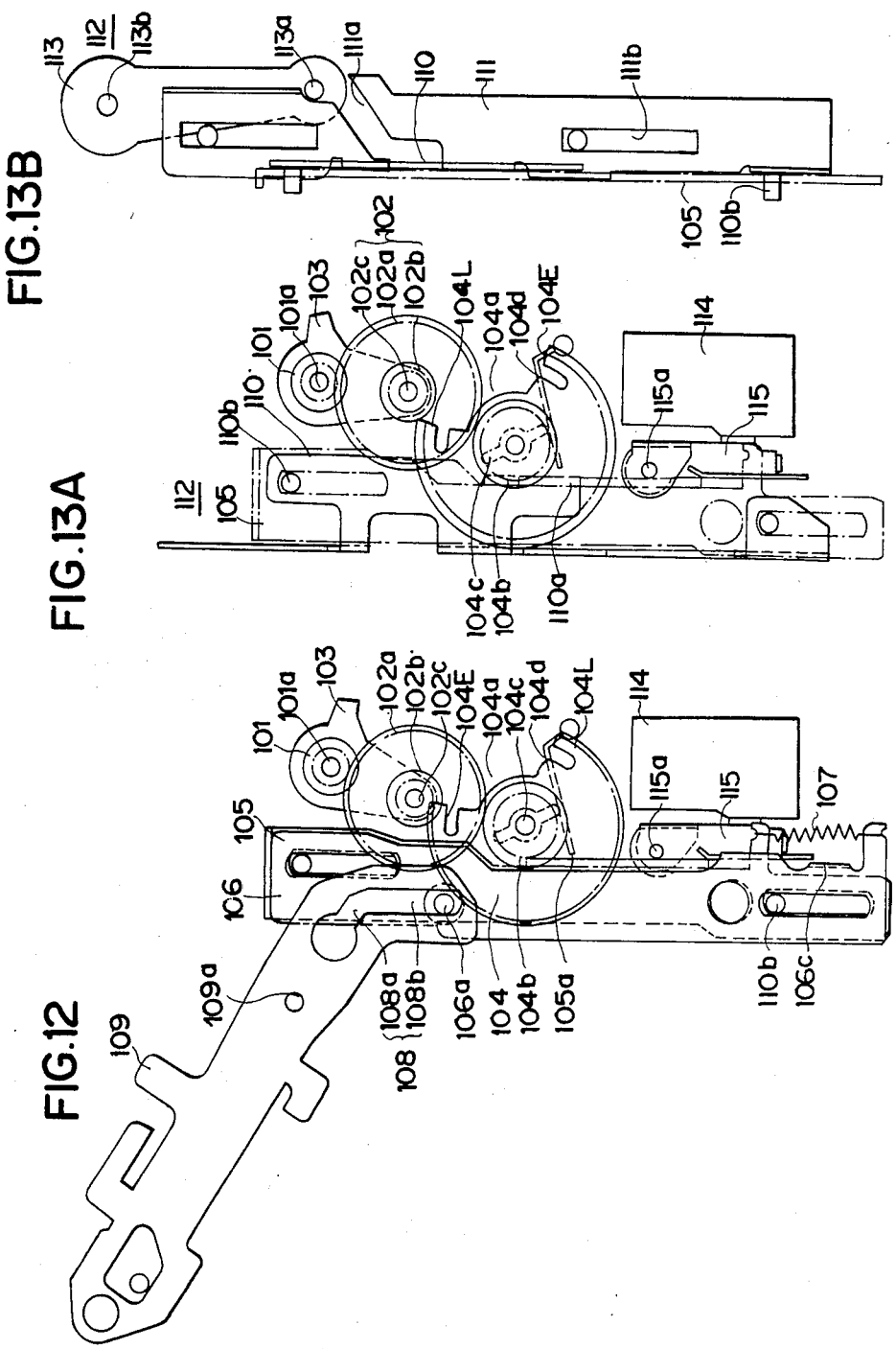

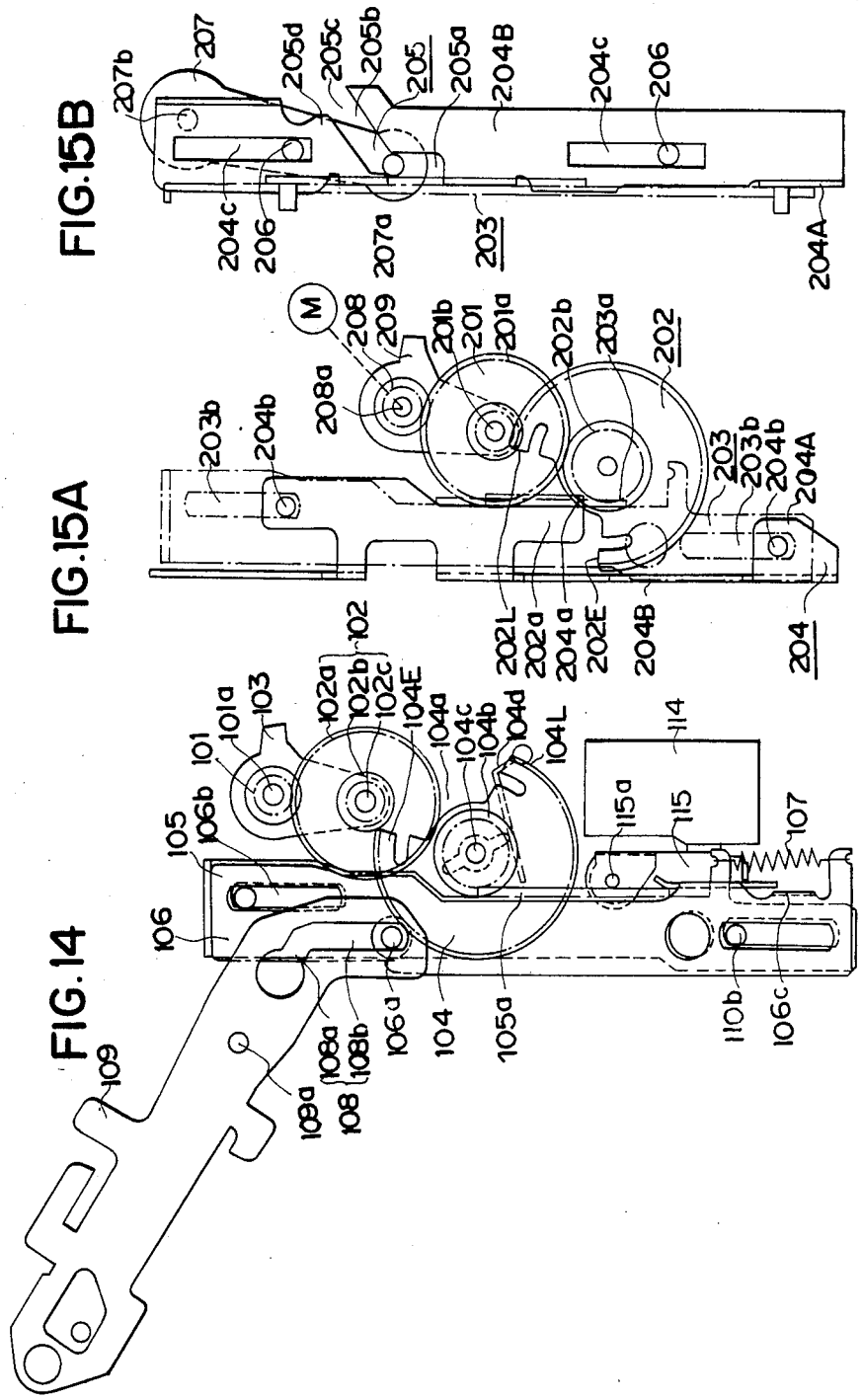

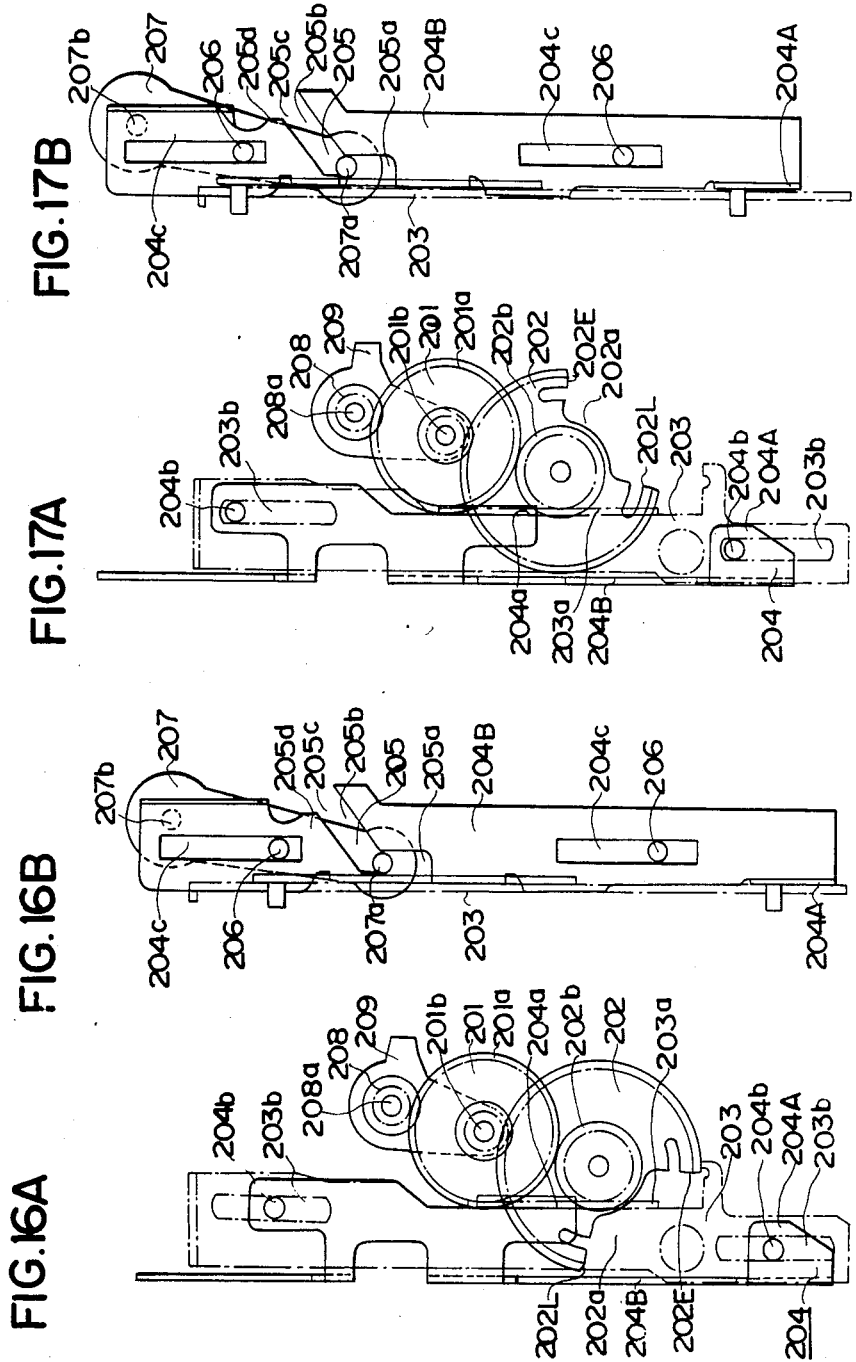

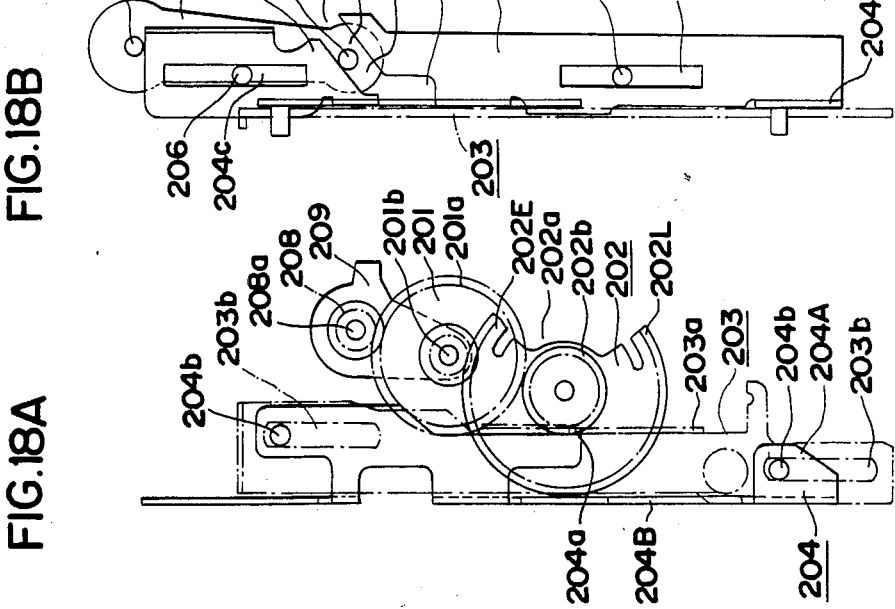

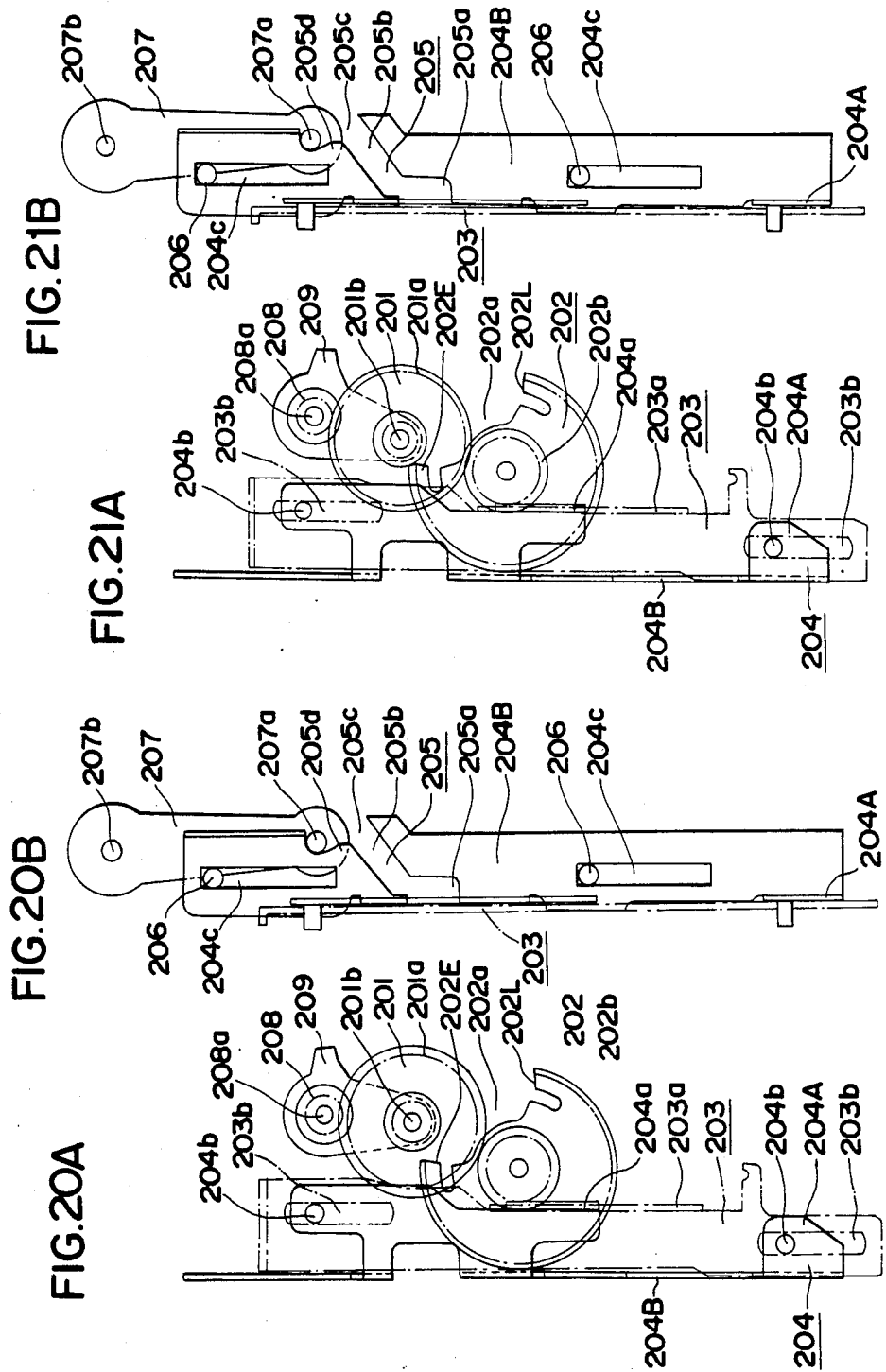

LOADING AND EJECTION MECHANISM FOR TAPE PLAYER

FIELD OF THE INVENTION

This invention relates to a mechanism in a tape player for loading and ejecting a tape cassette, and more particularly to one type of mechanism in which an inversible gear linearly reciprocates an ejection plate having a rack.

BACKGROUND OF THE INVENTION

In a tape player in general, a tape cassette is set in position by a series of loading operations, namely, first pulling the cassette into the tape player and then dropping it in the play position, and is removed by a series of ejecting operations, namely, first lifting it above the play position and then bringing it to a removable position.

The series of loading and ejecting operations are performed by dropping or lifting a pack guide which carries the cassette and by moving back and forth a pack stopper which guides the cassette back and forth. In the prior art mechanims, the pack guide and the pack stopper are activated by driving an eject arm and an eject plate by means of a motor-driven cam. More specifically, when the eject arm is engaged and rotated by the cam, the eject plate linked to the eject arm moves back and forth. Responsive to the back and forth movement of the eject plate, the pack guide carrying the cassette is dropped or lifted by a cam of the eject plate, and the pack stopper connected to the eject arm via a resilient member moves back and forth and brings the cassette into the tape player or to the removable position.

PROBLEMS INVOLVED IN THE PRIOR ART

The prior art mechanism described above involves the following drawback.

The cam cannot fully drive the eject arm and the eject plate unless the movable stroke of the former is larger than the strokes of the latter. Since the vertical movement stroke of the pack guide and the horizontal movement stroke of the pack stopper are determined by the size of a cassette, the cam must be large enough to drive them and hinders reduction of the entire dimension of the mechanism. Even if the mechanism uses a smaller cam, it will remain large-scaled because some means will be required to amplify the cam stroke.

Beside this, it is usual that the cam is simply activated in one operation, i.e. loading, for example, leaving the other operation, i.e., ejection, for example, to an energy stored in a resilient member during the loading operation. Since a significant energy is required to eject the cassette, the resilient member must have a corresponding scale. Therefore, the cam receives a load large enough to act on the resilient member during the loading operation, and requires an increased torque of the cam-driving motor.

OBJECT OF THE INVENTION

It is therefore an object of the invention to provide a loading and ejection mechanism which is small-scaled and simply requires a reduced torque of a motor.

SUMMARY OF THE INVENTION

In accordance with the invention, there is provided a loading and ejection mechanism in a tape player comprising:
- an inversion gear driven by a motor of the tape player and rotatable in one direction during loading of a tape pack into the tape player and in the other direction during ejection of a tape pack from the tape player;
- an eject plate movably mounted;
- a rack formed on said eject plate and engageable with said inversion gear;
- a guide arm to elevate and drop a pack guide;
- a cam formed in said eject plate and slidably engaged with said guide arm to elevate and drop said pack guide responsively to movement of said eject plate; and
- an eject arm linked to said eject plate to pivot responsively to the movement of said eject plate.

Another solution of the object is to provide a loading and ejection mechanism in a tape player comprising:
- an inversion gear driven by a motor of the tape player and rotatable in one direction during loading of a tape pack into the tape player and in the other direction during ejection of a tape pack from the tape player;
- a pull-and-push eject plate and lift-and-drop eject plate mounted in piles and movable simultaneously and independently;
- a rack formed on each said eject plate to engage said inversion gear;
- a guide arm to elevate and drop a pack guide;
- a tapered cam formed in said lift-and-drop eject plate and slidably engaged with said guide arm to elevate and drop said pack guide responsively to said lift-and-drop eject plate; and
- an eject arm linked to said pull-and-push eject plate to pivot responsively to the movement of said eject plate.

A still further solution of the object is to provide a loading and ejection mechanism in a tape player comprising:
- a drive gear driven by a motor of the tape player;
- an intermittent gear engageable with said drive gear;
- an eject plate movable with rotation of said intermittent gear;
- a guide arm pivotably mounted and biased to an elevated position;
- a tapered cam formed in said eject plate and engaged with said guide arm;
- a compression member formed in a lower portion of said tapered cam to engage said guide arm so that said eject plate is pushed by this engagement in a direction to separate said intermittent gear from said drive gear.

The invention will be better understood with the description given below, referring to some embodiments illustrated.

BRIEF DESCRIPTION OF THE DRAWINGS

FIGS. 1 through 6 accompanied by (A) are plan views of different modes of a loading and ejection mechanism embodying one form of the invention, and FIGS. 1 through 6 accompanied by (B) are side views showing the relationship between an ejection plate and a pack guide in different modes corresponding to Figures accompanied by (A) respectively, in which:

FIGS. 1(A) and 1(B) show the aspects at the time when the eject plate is at its withdrawal position before a loading operation and after an ejecting operation;

FIGS. 2(A) and 2(B) show the aspects at the start of a loading operation;

FIGS. 6(A) and 6(B) show the aspects upon completion of the loading operation.

FIGS. 7 through 14 illustrate a loading and ejection mechanism embodying a second form of the invention, in which:

FIG. 7 is a plan view showing the aspect upon completion of withdrawal of the eject plate;

FIG. 9 is a plan view showing the aspect at the start of a loading operation;

FIG. 10 is a plan view showing the aspect in the course of a loading or ejecting operation;

FIGS. 11(A) and 11(B) are a plan view and a side view of the eject plate before starting to advance or upon completion of the withdrawal;

FIG. 12 is a plan view showing the aspect just before completion of the loading operation or at the start of the ejecting operation;

FIGS. 13(A) and 13(B) are a plan view and a side view of the eject plate upon completion of the loading operation; and FIG. 14 is a plan view showing the aspect upon completion of the loading.

FIGS. 15 through 21 accompanied by (A) and (B) are plan views and side views in different modes of a loading and ejection mechanism embodying a third form of the invention, in which:

FIGS. 15(A) and 15(B) show the aspect before a loading operation and upon completion of an ejecting operation;

FIGS. 16(A) and 16(B) show the aspect during horizontal transport of a cassette;

FIGS. 17(A) and 17(B) show the aspect when the cassette begins to drop or has completed to rise;

FIGS. 18(A) and 18(B) show the aspect during vertical transport of the cassette;

FIGS. 19(A) and 19(B) show the aspect just before completion of the loading;

FIGS. 20(A) and 20(B) show the aspect upon completion of the loading; and

FIGS. 21(A) and 21(B) show the aspect at the start of the ejection.

Figure 3B:
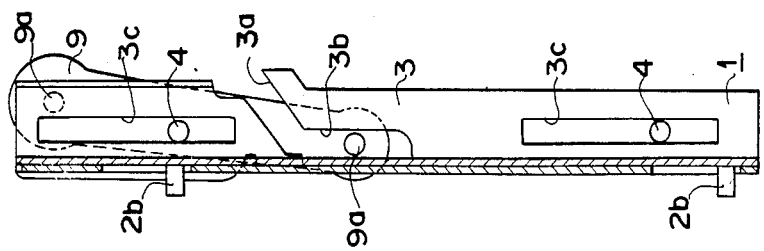
FIGS. 3(A) and 3(B) show the aspects during transport of a cassette.

The invention will be better understood with the description given below, referring some embodiments illustrated.

DETAILED DESCRIPTION OF THE PREFERRED EMBODIMENTS

FIRST EMBODIMENT

The first embodiment of the loading and ejection mechanism according to the invention will be hereunder explained, referring to FIGS. 1 through 6.

An ejection plate assembly 1 comprises a base plate 2 and an attached side plate 3. The base plate 2 has a rack 2a formed along a side edge thereof. A pair of slide pins 2b are provided on the base plate 2 near its front and rear ends. The side plate 3 has formed at a central portion thereof a tapered cam 3a and a continuous slide slit 3b. The side plate 3 also has formed near both ends thereof a pair of elongated slide holes 3c. Each slide hole 3c engages a pin 4 formed on the chassis of the tape player to support the eject plate 1 slidable back and forth with respect to the chassis.

Above the base plate 2 is mounted a slide plate 5 which has a guide pin 5a at a central portion and a pair of slide holes 5b near both ends. The slide holes 5b received the slide pins 2b of the eject plate 1 to provide a parallel relative movement between them. The eject plate 1 and the slide plate 5 are biased by a tension spring 6 connected therebetween to provide a configuration that the slide pins 2b abut the front ends of the slide holes 5b. The slide plate 5 has formed at the front end thereof a compression member 5c to act on a switch which will be described later.

Above the slide plate 5 is mounted an eject arm 8 which has a cam 7 near one end thereof and is pivotable about an axle 8a. The cam 7 includes a push portion 7a and a relief portion 7b and engages the guide pin 5a of the slide plate 5. Where the guide pin 5a is received in the push portion 7a, the eject arm 8 rotates in response to back and forth movements of the slide plate 5. Where the guide pin 5a is received in the relief portion 7b, the both members are slidable with respect to each other. The cam 3a and the slide slot 3b of the side plate 3 engage a guide pin 9a formed at the front end of a guide arm 9 which is dropped or elevated together with a pack guide not shown. As the guide pin 9a slides along the cam 3a with back and forth movements of the eject plate 1, the guide arm 9 rotates against a resilient force about an axle 9b at the rear end thereof.

Beside the eject plate 1 and the slide plate 5 is mounted a drive gear 10 which is linked to a motor to rotate clockwise during ejection and counterclockwise during loading. The drive gear 10 engages a large gear 11a which is a member of a connection gear 11 together with a coaxial small gear 11b. An axle 11c of the connection gear 11 is formed on one end of a connection arm 12 which is pivotable about an axle 10a of the drive gear 10. With rotation of the connection arm 12, the connection gear 11 is moved to the right and left. A frictional force is produced between the connection arm 12 and the axle 10a, so that the connection arm 12 rotates (to displace the connection gear 11), following to the rotation of the drive gear 10, in a limited range determined by a member not shown, unless an external counter force is applied.

The small gear 11b of the connection gear 11 engages an intermittent gear 13 which includes a non-toothed portion 13a defined by an ejection end 13E and a loading end 13L. The intermittent gear 13 is coaxial with inversion gear 13b which engages the rack 2a of the eject plate 1. The intermittent gear 13 has formed a cam 13c which is biased by a spring plate 14 to place the center of the non-toothed portion 13a opposed to the connection gear 11 when the intermittent gear is so rotated.

In front of the eject plate 1 is provided a power supply switch 15 so that a switch push member 16 compresses a contact 15a to drive a motor M which in turn rotates the drive gear 10. The switch push member 16 is pivotable about an axle 16a and is biased by a resilient member apart from the contact 15a so that it compresses the contact 15a simply when the push member 5c compresses it during advance (i.e., downward in the Figures) of the slide plate 5.

The first embodiment with the above-described construction operates as follows.

(1) Normal State (before loading and after completion of ejection) . . . FIG. 1:

At the normal state where a cassette is not inserted into the tape player, the eject plate 1, the slide plate 5 and the eject arm 8 are located at their withdrawal positions (rearward positions of the tape player), and the pack guide not shown is maintained at its elevated position together with the guide arm 9. More specifically, the guide pin 5a of the slide plate 5 is received in the push portion 7a within the cam 7 of the eject arm 8, and the guide pin 9a of the guide arm 9 contacts the front end of the slide slot 3b. The intermittent gear 13 is located so that the non-toothed portion 13a thereof is diagonally, rearwardly opposed to the eject plate 1 with the loading end 13L thereof being engaged with the small gear 11b of the connection gear 11 and the inversion gear 13b thereof being engaged with the front end of the rack 2a. Since the slide plate 5 is at the withdrawal position, the push member 5c thereof does not compress the switch push member 16, leaving it biased apart from the switch contact 15a.

(2) Start of Loading . . . FIG. 2:

An inserted cassette pushes the pack stopper not shown so as to rotate the eject arm linked thereto in the clockwise direction about the axle 8a. With the forward rotation of the cam-formed end of the eject arm 8, the guide pin 5a of the slide plate 5 located in the push portion 7a of the cam 7 is pushed forward (downward), together with the slide plate 5. When the cassette is inserted to a predetermined position where the slide plate 5 takes a predetermined position, the push member 5c of the slide plate 5 compresses the switch push member 16 so as to act on the contact 15a. Thus the motor is driven.

Since the drive gear 10 is kept unrotatable before the motor is driven, the connection gear 11, the intermittent gear 13 and the rack 2a which are linked in sequence to the drive gear 10 are maintained inoperative at their positions in the normal state (1) above. Therefore, before the power source is thrown over, the eject plate 1 stands still whereas the slide plate 5 moves forward against the spring 6.

Figure 3A:
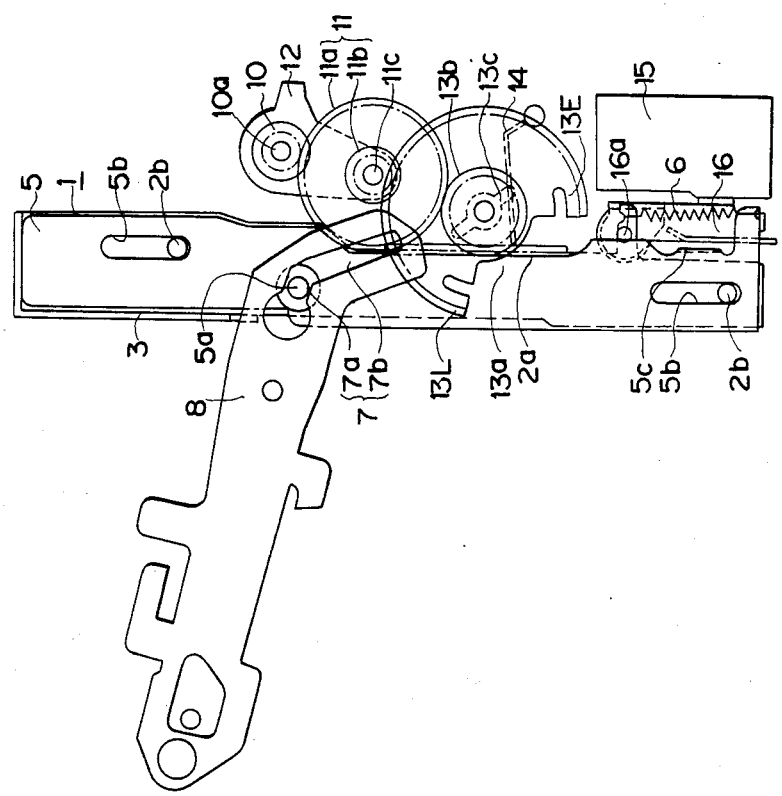

(3) Induction of the Cassette . . . FIG. 3:

When the motor starts to rotate from the state of (2) above, the drive gear 10 begins to rotate counterclockwise. Therefore, the intermittent gear 13 is rotated counterclockwise via the connection gear 11, so that the eject plate 1 is moved forward by the inversion gear 13b. Therefore, the guide pin 9a of the guide arm 9 is displaced within the slide slot 3b toward the cam 3a of the eject plate 1. After the eject plate 1 reaches the position to catch up to the slide plate 5, the latter is also moved forward with a further advance of the eject plate 1 because the slide pins 2b push the front edges of the slide holes 5b. Therefore, the eject arm 8 is rotated clockwise by the guide pin 5a to bring the cassette into the back position of the pack guide not shown.

Figures 4A, 4B:
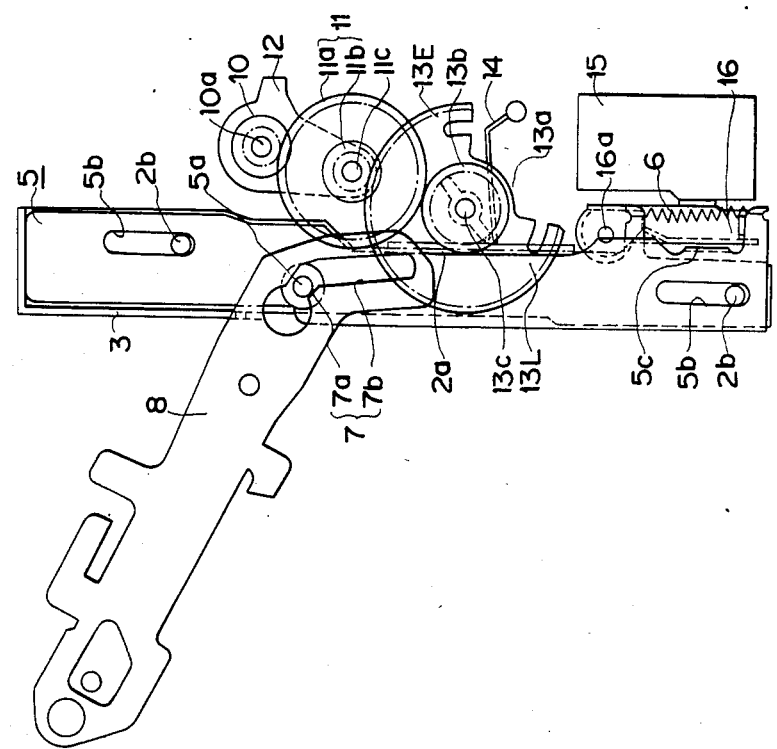
FIGS. 4(A) and 4(B) show the aspects at the time when the pack guide begins to drop or has completed to rise.

(4) Start of the Pack Guide Dropping . . . FIG. 4:

When the eject plate 1 advances, with rotation of the drive gear 10 from the state of (3) above, to a position where the center of the rack 2a is aligned with the center of the intermittent gear 13, the guide pin 9a of the guide arm 9 is transferred from the slide slot 3b to the cam 3a. Thereafter, with further advance of the eject plate 1, the guide pin 9a is guided by the cam 3a so as to drop the pack guide against a resilient force. Since the eject arm 8 completes its rotation to the loading position before the pack guide drops, the guide pin 5a of the guide plate 5 enters and moves in the relief portion 7b of the cam 7.

Figure 5B:
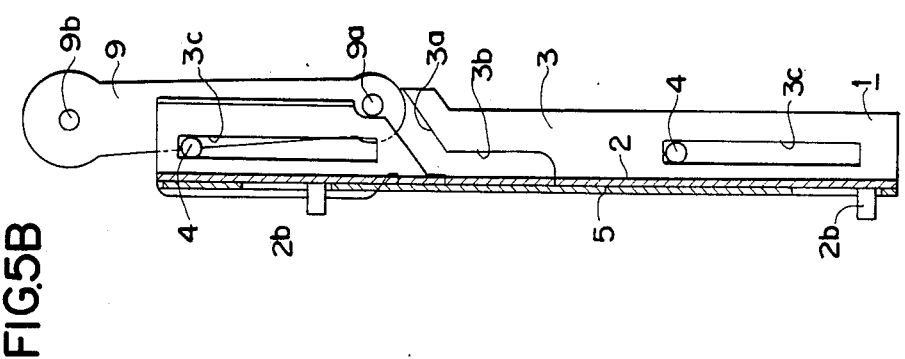
FIGS. 5(A) and 5(B) show the aspects at the time when the pack guide has completed to drop or begins to rise.
Figure 5A:
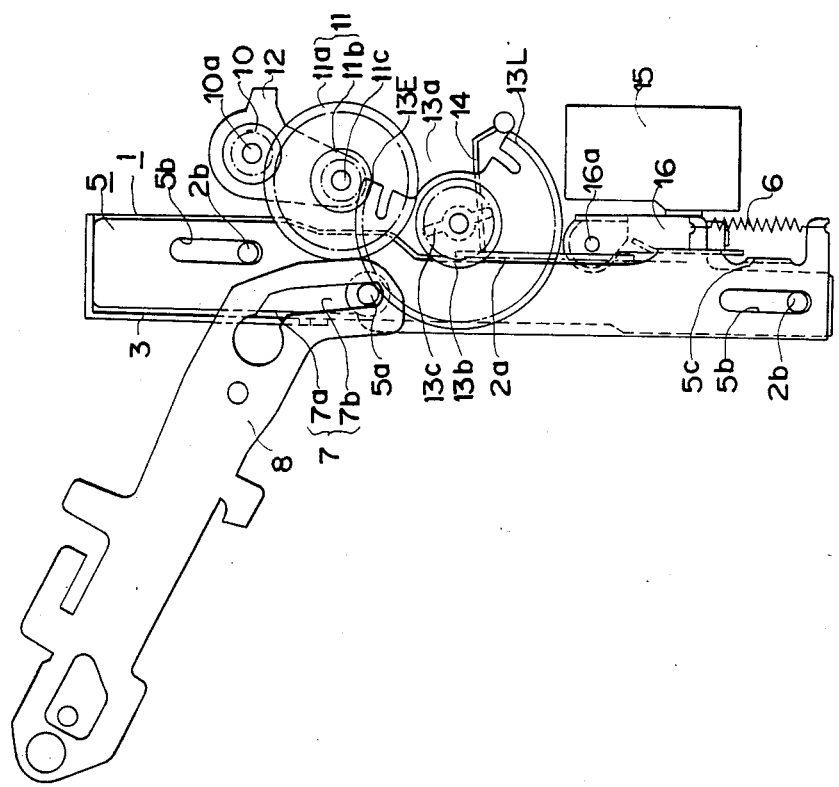

(5) Completion of Loading . . . FIG. 5 to FIG. 6:

When the eject plate 1 moves to a position where the rear end of the rack 2a is aligned with the center of the intermittent gear 13, the guide pin 9a of the guide arm 9 is placed at the entrance of the cam 3a, the pack guide is fixed at a lower given position. The guide pin 5a of the slide plate 5 is received in the front end of the relief portion 7b of the cam 7.

The intermittent gear 13 engages at the ejection end 13E with the small gear 11b of the connection gear 11. Therefore, with a further rotation of the drive gear 10, the intermittent gear 13 stops, with the non-toothed portion 13a being opposed to the connection gear 11. More specifically, since the connection arm 12 is rotated counterclockwise by the axle 10a with rotation of the drive gear 10, the connection gear 11 is displaced to the right. At the same time, the intermittent gear 13 is biased by the spring plate 14 via the cam 13c. Therefore, the intermittent gear 13 is detached from the motor and is locked there.

(6) Start of Ejection (start of the pack guide elevation) . . . FIG. 6 to FIG. 5:

With a command for ejection, the motor is driven to the contrary so as to clockwisely rotate the inversion gear 10 which was formerly rotated counterclockwise. With this rotation, the connection arm 12 is rotated from the right to the left to displace the connection gear 11 to the left into engagement with the ejection end 13E of the intermittent gear 13. Thus, the intermittent gear 13 also starts rotating clockwise and acts on the rack 2a to convey the eject plate 1 rearward. The slide plate 5 is concurrently moved rearward due to the connection by the spring 6. Since the guide pin 5a climbs up within the relief portion 7b toward the push portion 7a, the eject arm 8 does not receive any pressure from the guide pin 5a and remains there.

With the withdrawal of the eject plate 1, the guide pin 9a of the guide arm 9 is guided by the cam 3a and is moved from the lower end thereof toward the slide slot 3b. Therefore, the guide arm 9 and the pack guide united thereto start lifting together with the cassette.

(7) Ejection of the Cassette . . . FIG. 4 to FIG. 3:

With a further rotation of the drive gear 10 to withdrawn the eject plate 1 to a position where the center of the rack 2a is aligned with the center of the intermittent gear 13, the pack guide completes its lift. At that time, the guide pin 5a of the slide plate 5 reaches the push portion 7a from the relief portion 7b. With a further withdrawal of the eject plate 1, the eject arm 8 is rotated counterclockwise about the axle 8a, conveying the pack stopper not shown forward. Thus the cassette is ejected from the pack guide.

(8) Completion of Ejection . . . FIG. 1:

With a further rotation of the drive gear 10 until the eject plate 1, the slide plate 5 and the eject arm 8 complete their withdrawal, with the push member 5c of the slide plate 5 detached from the switch push member 16, the power source is removed, and the inversion gear 13 stops at the position in the state (1) above.

As described above, the first embodiment of the loading and ejection mechanism according to the invention is configured to move the eject plate back and forth by means of the inversion gear engaging the rack of the eject plate. Therefore, it is possible to provide a sufficiently large stroke of the eject plate, with use of a smaller gear, thus omitting a large-scaled cam or stroke amplification means in the prior art mechanism. Beside this, the load imposed to the motor is greatly reduced by a gear ratio of the inversion gear which is selected to reduce the torque of the motor, or by omission of a resilient member which is used in the prior art mechanism to give an energy for loading or ejection but in turn increases the energy to operate the eject plate.

The slide plate provided between the eject plate and the eject arm to throw the switch for the motor may be omitted when the switching operation is performed by any other means.

SECOND EMBODIMENT

Referring now to FIGS. 7 through 14, second embodiment of the invention will be described hereunder.

Figure 7:
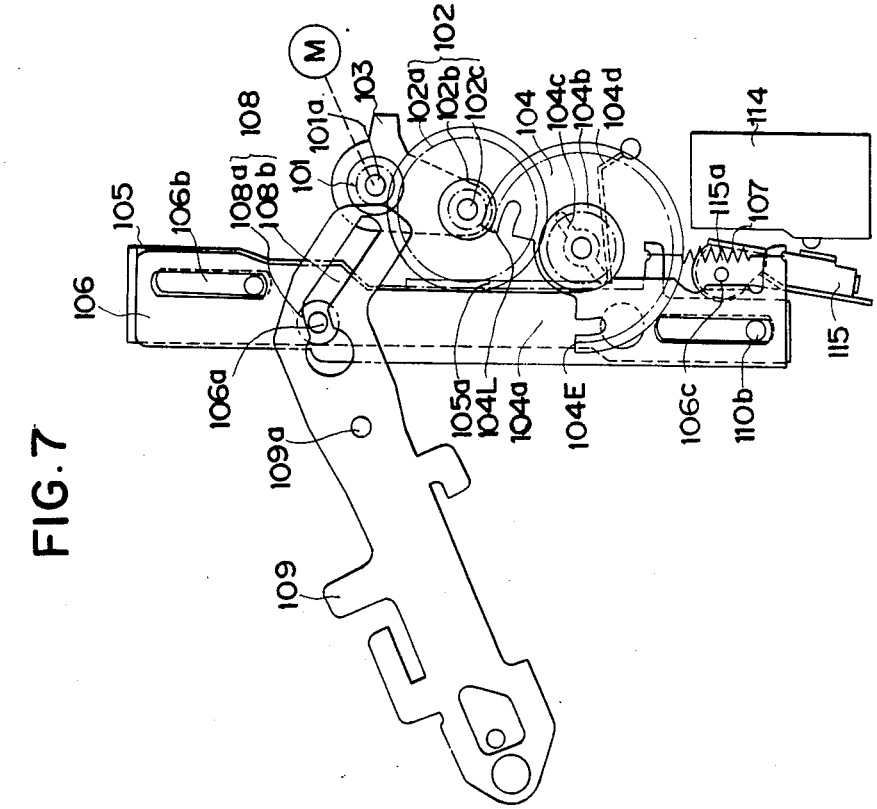

As shown in FIG. 7, a drive gear 101 is linked to a motor to rotate clockwise during ejection and counterclockwise during loading. The drive gear 101 engages a large gear 102a of a connection gear 102 which also includes a coaxial small gear 102b. An axle 102c of the connection gear 102 is formed on one end of a connection arm 103 pivotable about an axle 101a of the drive gear 101, so that the connection gear 102 is displaced to the right and left with pivotal movement of the connection arm 103. The connection arm 103 is mounted on the axle 101a so as to produce a frictional force therebetween, and is therefore rotate (to displace the connection gear 102) by the drive gear 101 in the same direction within a range limited by a member not shown, unless an external counter force is applied. The small gear 102b of the connection gear 102 is engageable with an intermittent gear 104 which has a non-toothed portion 104a defined by ejection and loading ends 104E and 104L. The intermittent gear 104 has a inversion gear 104b engageable with two racks which will be described later. The intermittent gear 104 has formed therein a cam 104c contacting a spring plate 104d which biases the intermittent gear 104 to place the center of the non-toothed portion 104a opposed to the connection gear 2 while it is disposed so.

A pull-and-push eject plate 105 for pulling or ejecting a cassette into or out of the tape player has formed a rack 105a along a side edge thereof. The pull-and push eject plate 105 also has formed two slide holes 105b and an engagement member 105c at the front and rear ends thereof. The rack 105a has a length corresponding to the total of the movement stroke of the pull-and-push eject plate 105 itself and the movement stroke of a lift-and-drop eject plate 112 mounted thereunder, and engages the inversion gear 104b of the intermittent gear 104. Above the pull-and-push eject plate 105 is overlaid a slide plate 106 which has a guide pin 106a, two slide holes 106b and a push member 106c. The slide holes 105b of the pull-and-push eject plate 105 coincide the slide holes 106b of the slide plate 106 to allow pins of the lift-and drop eject plate 112 to pass through the two plates. Thus, the pull-and-push eject plate 105 and the slide plate 106 in interfacial contacting relationship are slidable with respect to the lift-and-drop eject plate 112 thereunder when the former are located rearward of a predetermined position, and are united to the lift-and-drop eject plate 112 when they advance to the predetermined position. The pull-and-push eject plate 105 and the slide plate 106 are connected by a spring 7 provided at the front ends thereof. The engagement member 105c at the rear end of the pull-and-push eject plate 105 engages the rear end of the slide plate 106 so that the latter never moves rearward of the former.

Above the slide plate 106 is mounted an eject arm 109 which has a cam 108 including a push portion 108a and a relief portion 108b and is pivotable about an axle 109a formed on a base of the tape player. The cam 109 engages the guide pin 106a of the slide plate 106. The eject arm 109 is rotated by the back and forth movement of the slide plate 106 when the guide pin 106a engages the push portion 108a, but is not affected by the slide plate 106 when the guide pin 106a is received in the relief portion 108b.

Below the pull-and-push eject plate 105 is mounted the lift-and-drop eject plate 112 which includes a base plate 110 and a side plate 111 as shown inFIG. 11. The base plate 110 has formed a rack 110a and two front and rear pins 110b. The rack 110a has a length corresponding to the stroke to lift and drop a guide arm (therefore shorter than the length of the rack 105a of the pull-and push eject plate 105). The pins 110b pass through the pull-and-push eject plate 105 and the slide plate 106 as described before. The rack 110a does not engage the inversion gear 104b of the intermittent gear 104 unless the pull-and-push eject plate 105 advances and pushes the lift-and-drop eject plate 112 forward via the pin 110b. The side plate 111 has formed a tapered cam 111a and slide holes 111b. The tapered cam 111a slidably engages a guide pin 113a formed on one end of a guide arm 113. The guide arm 113 is pivotable about an axle 113b provided at the other end thereof, and is biased downward by a resilient member not shown.

In front of the intermittent gear 104 is provided a power source switch 114 which is configured so as to drive a motor M and hence rotate the drive gear 101 when a switch push member 115 compresses a contact 114a. The switch push member 115 is pivotable about an axle 115a and is biased away from the contact 114a by a spring (not shown) so that it does not compress the contact 114a unless the slide plate 106 advances.

The second embodiment of the loading and ejection meohanism operates as follows.

Figures 8A, 8B:
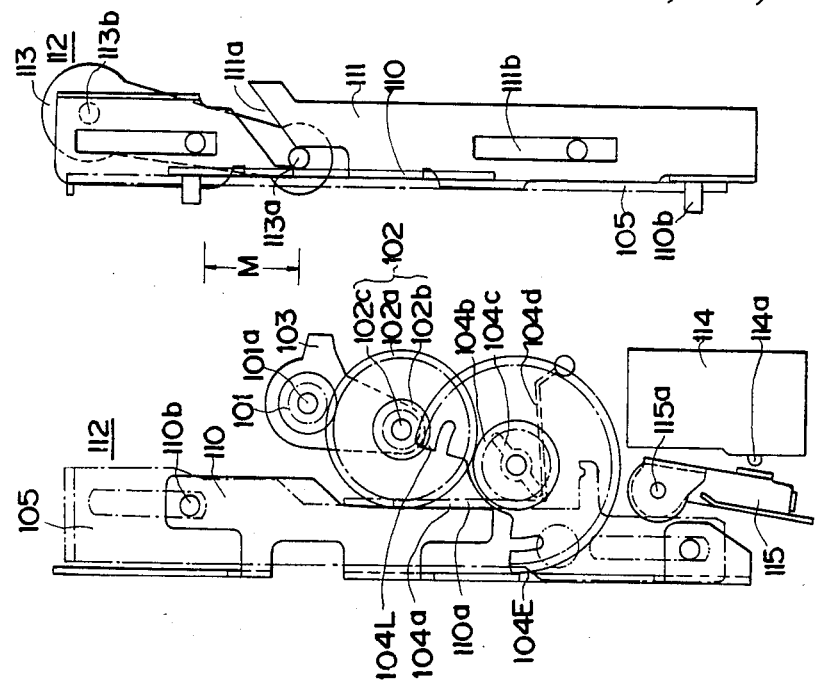
FIGS. 8(A) and 8(B) are a plan view and a side view of the eject plate during withdrawal.

(1) Dormant (before loading and after completion of ejection) . . . FIG. 7 and FIG. 8:

Before insertion of a cassette or after removal thereof, the both eject plate 105 and 112 and the eject arm 109 are placed at their withdrawal positions, and the guide arm 113 is at the elevated position.

As shown in FIG. 7, since the connection arm 103 is rotated to the left, the connection gear 102 is in the left position, with the small gear 102b thereof engaging the loading end 104L of the intermittent gear 104. The inversion gear 104b of the intermittent gear 104 engages the front end of the rack 105a of the pull-and-push eject plate 105.

The pull and-push eject plate 105 and the slide plate 106 are disposed by the spring 107 so that the both slide holes 105b and 106b fully coincide. Thus the pins 110b of the lift-and-drop eject plate 112 are positioned at the front ends of the both slide holes. The guide pin 106a of the slide plate 106 is received in the push portion 108a within the cam 108 of the eject arm 109.

As shown in FIG. 8, the rack 110a of the lift-and-drop eject plate 112 stands apart from the inversion gear 104b of the intermittent gear 104. The guide pin 113a of the guide arm 113 is positioned at the upper end of the cam 111a of the lift-and-drop eject plate 112.

(2) Start of Loading . . . FIG. 9:

An inserted cassette pushes the eject arm 109 via a pack stopper against the resilient force, so as to rotate the eject arm 109 clockwise about the axle 109a. With this rotation, the push portion 108a of the cam 108 pushes the guide pin 106a and moves the slide plate 106 forward.

On the other hand, since the motor is not driven, the drive gear 101, the connection gear 102, the intermittent gear 104 and the pull-and-push eject plate 105 which are linked in sequence to the motor are maintained at their positions in the state of (1) above before loading. Therefore, the slide plate 106 simply advances against the spring 7.

(3) Induction of the Cassette . . . FIGS. 10 and 11:

When the motor M is driven by application of the power source, the drive gear 101 rotates counterclockwise. Thus the intermittent gear 104 is rotated counterclockwise via the connection gear 102 and moves the pull-and-push eject plate 105 forward via the rack 105a. As the result, the pull-and-push eject plate 105 fully coincides with the slide plate 106 again so that the spring 107 unites them to provide their simultaneous advance thereafter. At that time, the guide pin 106a of the slide plate 106 still remains in the push portion 108a of the cam 108. Therefore, contrary to the state before application of the power source, the advance of the slide plate 106 drives the eject arm 109 so as to pull the cassette engaging the tip thereof into the pack guide together with the pack stopper. The pull-and-push eject plate 105 and the slide plate 106 further advance to bring the rear ends of the slide holes 105b and 106b in contact with the pins 110b of the lift-and-drop eject plate 112 (FIGS. 10 and 11).

With a further advance of the two plates 105 and 106, the rear ends of the slide holes 105b and 106b push the pins 110b and thrust the lift-and-drop eject plate 112 forward. As the result, the front end of the rack 110 of the lift-and-drop eject plate 112 engages the inversion gear 104b of the intermittent gear 104. Thereafter the lift and-drop eject plate 112 is also moved forward together with the two plates 105 and 106 thereabove by the energy of the motor M via the intermittent gear 104.

(4) Drop of the Cassette . . . FIGS. 12, 13 and 14:

With a further rotation of the drive gear 101, the both eject plates 105 and 112 and the slide plate 106 further advance. With the advance of the lift-and-drop eject plate 112, the guide pin 113a of the guide arm 113 slides along the tapered cam 111a, and the guide arm 113 is dropped by a spring (not shown) to set the cassette in position.

When the slide plate 106 reaches its withdrawal position with the advance of the slide plate 106, the relief portion 108b of the cam 108 becomes parallel to the slide plate 106. The guide pin 106a then enters in the relief portion 108b and is allowed to slide therein toward the front end thereof. Therefore, regardless of a further advance of the slide plate 106 during the drop of the guide arm 113, the eject arm 109 does not rotate.

With a further rotation of the drive gear 101 until the intermittent gear 104 is so located that the ejection end 104E engages the small gear 102b of the connection gear 102, the upper and lower eject plates 105 and 112 complete their advance, placing the guide pin 106a of the slide plate 106 at the front end of the relief portion 108b of the eject arm 109 (FIG. 12). Beside this, the guide arm 113 completes the drop, with the guide pin 113a thereof arriving at the lower end of the cam 111a of the lift-and-drop eject plate 112, and is fixed there by a spring (FIG. 13).

At that time, the intermittent gear 104 engaged with the rear end of the rack 105a of the pull-and-push eject plate 105 via the inversion gear 104b is not rotated because the plate 105 is fixed immovable. As the result, the connection gear 102 engaged with the intermittent gear 104 rotates alone clockwise and changes its position to the right so as to face the non-toothed portion, rotating the connection arm 103 counterclockwise. Since the drive gear 101 rotates counterclockwise, the connection arm 103 is biased counterclockwise due to the friction at the axle 101a and maintains the connection gear 102 there. Therefore, since the intermittent gear 104 is detached from the motor M after completion of loading, no excessive load is applied to the motor M or other members thereafter.

(5) Start of Ejection . . . FIG. 12:

With a command for ejection, the drive gear 101 which has been driven counterclockwise starts rotating clockwise so as to rotate the connection arm 103 clockwise (to the left) via the axle 101a. Thus the connection gear 102 engages the ejection end 104E of the intermittent gear 104 again and drives the intermittent gear 104 clockwise (to the contrary). Therefore, the upper and lower eject plates 105 and 112 engaging the inversion gear 104b of the intermittent gear 104 begin their withdrawal, contrary to the motion during loading.

(6) Ejection . . . FIGS. 10 and 11:

The pull-and-push eject plate 105 unitedly moves with the slide plate 106 as in the loading operation. Due to the withdrawal of the slide plate 106, the guide pin 106a which has been at the front end of the relief portion 108b slides up therewithin, leaving the eject arm 109 immoved.

With the retreat of the lift-and drop eject plate 112, the guide pin 113a which has been at the lower end of the cam 111a moves up toward the upper end thereof against the resilient force biasing the guide arm 113 downward. Thus the guide arm 113 is elevated.

After the guide arm 113 is fully lifted and is fixed to its upper stable position, the lift-and-drop eject plate 112 stops, with its rack 110a being disengaged from the intermittent gear 104. At that time, the guide pin 106a of the slide plate 106 changes its position from the relief portion 108b to the push portions 108a of the cam 108 of the eject arm 109.

(7) Completion of Ejection . . . FIGS. 7 and 8:

With a further rotation of the drive gear 101, withdrawing the pull-and-push eject plate 105 and the slide plate 106, the cam-formed end of the eject arm 109 is pushed rearward by the guide pin 106a engaging the push portion 108a. When the pull-and-push eject plate 105 and the slide plate 106 are fully withdrawn to the positions before loading, the other end of the eject arm 109 is returned to the front position of the tape player. Thus the pack stopper linked thereto also advances and ejects the cassette from the pack guide.

At that time, since the push member 106c of the slide plate 106 is detached from the switch push member 115, the switch push member 115 is moved away from the contact 114a by a resilient member (not shown). Thus the motor M stops due to removal of the power source. As the result, the drive gear 101 stops at the position where the loading end 104L of the intermittent gear 104 engages the connection gear 102.

As described above, the second embodiment of the loading and ejection mechanism according to the invention is configured to move the eject plate back and forth by means of the inversion gear engaging the rack of the eject plate. Therefore, it is possible to provide a sufficiently large stroke of the eject plate, with use of a smaller gear, thus omitting a large-scaled cam or stroke amplification means as in prior art mechanisms.

Since two eject plates are employed in the second embodiment, the significant load by the spring for use to drop the pack guide is simply applied to the lift-and-drop eject plate (simply when the pack guide is elevated). Therefore, the load applied during loading and ejection of a cassette is greatly reduced, thus enabling reduction of the necessary torque of the motor, as compared to the prior art construction employing a single eject plate.

Beside this, the double-layered arrangement of the two eject plates contributes to reduction of the movement stroke of the lift-and drop eject plate, in particular, and therefore saves the space for the rearward displacement thereof, as compared to the prior art construction employing a single eject plate. This results in a reduction of the scale of the mechanism. It should be notes that the movement stroke of the pull-and-push eject plate is the same as the prior art. However, since the pivot axle of the eject arm moved by the eject plate may be formed at a selected position to provide a large movement in the center of the tape player, this never protrudes from the rear end of the tape player.

The intermittent gear employed in the second embodiment to detach the inversion gear from the motor may be replaced by any other means such as a clutch.

The slide plate provided between the eject plate and the eject arm to activate the motor-driving switch may be omitted when the switching operation is performed by any other means.

THIRD EMBODIMENT

Referring now to FIGS. 15 through 21, a third embodiment of the invention, representing a variant of the second, will be described.

In FIG. 15, a connection gear 201 linked to a motor rotates clockwise during loading and counterclockwise during ejection. The connection gear 201 engages an intermittent gear 202 which includes a non-toothed portion 202a defined by ejection and loading ends 202E and 202L. The intermittent gear 202 has a inversion gear 202b engaging racks 203a and 204a of two eject plates 203 and 204 which are mounted in confronting sliding relationship, and one of which is configured to pull and push a cassette into and out of the tape player and the other is configured to elevate and drop the cassette, i.e. the pull-and-push eject plate 203 moves a pack stopper back and forth via an eject arm (not shown) linked thereto and the lift-and-drop eject plate 204 is linked a guide arm to elevate or drop the pack guide as will be described later.

The rack 203a along one side edge of the pull-and-push eject plate 203 has a length corresponding to the total of the movement stroke of itself required for pulling the cassette and the movement stroke of the lift-and-drop eject plate 204 thereunder. The pull-and-push eject plate 203 has formed two slide holes 203b at the front and rear ends thereof and receives therein pins 204b of the lift-and-drop eject plate 204. Thus, the pull-and-push eject plate 203 is slidable with respect to the lift-and-drop eject plate 204 when the former is positioned rearward of a predetermined position, but is united to the latter by engagement between the pins 204b and the rear end of the slide holes 203b when and after the former advances to the position.

The lift-and-drop eject plate 204 comprises a base plate 204A and a side plate 204B. The base plate 204A has formed the above-mentioned rack 204a and pins 204b. The rack 204a of the base plate 204A has a length corresponding to its movement stroke required for elevating and dropping a guide arm (hence is shorter than the rack 203a of the pull-and-push eject plate 203). The rack 204a does not engage the inversion gear 202b of the intermittent gear unless the pull-and-push eject plate 204 advances and pushes the lift-and-drop eject plate 204 forward via the pins 204b. The side plate 204B has formed a tapered cam 205 and front and rear slide holes 204c. The slide holes 204c engage pins 206 formed on a chassis of the tape player to support the lift-and-drop eject plate 204 slidably back and forth. The tapered cam includes a tapered portion 205a and upper and lower horizontal portions 205b and 205c. The lower horizontal portion 205c has formed at one end nearer to the tapered portion 205a a projection 205d having a tapered configuration at the back thereof. The tapered cam 205 slidably engages a guide pin 207a which is a lifting axis of a guide arm 207. The guide arm 207 is pivotable up and down about an axle 207b formed at the rear end thereof, and is biased from above and under by a spring (not shown) or by a resilient energy of itself so as to normally take a reference position for the cassette moving action (the position to place the guide pin 207a at the lower horizontal portion 207c).

The large gear 201a of the connection gear 201 engages a drive gear 208 which is rotated in either direction by a motor. Therefore, the connection gear 201 is rotated contrary to the drive gear 208. An axle 201b of the connection gear 201 is formed at one end of a connection arm 209 which is pivotable about an axle 208a of the drive gear 208. When the connection arm 203 rotates, the connection gear 201 is displaced to the right and left. A frictional force is produced between the drive arm 209 and the axle 208a of the drive gear 208 to slightly rotate the connection arm 203 (and hence displace the drive gear 201) with rotation of the connection gear 208 within a range limited by a member (not shown), unless an external counter force is applied.

The third embodiment of the loading and ejection mechanism according to the invention operates as follows.

(1) Cassette Removal Position (before loading and after completion of ejection) . . . FIG. 15:

Before a cassette is inserted or after the cassette is removed, the connection gear 201 engages the loading end 202L of the intermittent gear 202. The inversion gear 202b of the intermittent gear 202 engages the rack 203a of the pull-and-push eject plate 203. At that time, the two eject plates 203 and 204 are located at their withdrawal positions, placing the pins 204b of the lift-and-drop eject plate 204 at the front ends of the slide holes 203b of the pull-and-push eject plate 203. The rack 204a of the lift-and-drop eject plate 204 stands apart from the inversion gear 202b of the intermittent gear 202, placing the guide pin 207a of the guide arm 207 (at the elevated position) at the upper horizontal portion within the tapered cam 205 of the eject plate 204 to arrive at the rear ends of the slide holes 203b with a further advance of the pull-and-push eject plate 203, after the cassette insertion is completed.

With a further advance of the pull-and-push eject plate 203, the lift-and-drop eject plate 204 advances together because the rear ends of the slide holes 203b push the pins 204b.

(4) Drop of the Cassette . . . FIG. 18:

With a further rotation of the connection gear 201, the upper and lower eject plates 203 and 204 further advance. With the advance of the lift-and-drop eject plate 204, the guide pin 207a of the guide arm 207 changes its position within the tapered cam 205 from the upper horizontal portion 205b to the tapered portion 205a, and thereafter slides along the tapered portion 205a so as to drop the guide arm 207.

(5) Completion of Loading . . . FIGS. 19 and 20:

With a further rotation of the intermittent gear 202, passing the position where the ejection end 202E thereof engages the connection gear 201, until the non-toothed portion 202a is opposed to the connection gear 201, the intermittent gear 202 disengages from the connection gear 201 and stops. Thus the upper and lower eject plate 203 and 204 complete their advance. At that time, the rack 203a of the pull-and-push eject plate 203 disengages from the intermittent gear 202, but the rack 204a of the lift-and-drop eject plate 204 still engages the intermittent gear 202.

The guide pin 207a of the guide arm 207 moves within the tapered cam 205 of the lift-and-drop eject plate 204 from the tapered portion 205a toward the projection 205d (FIG. 19). Since up and down pressures are applied to the guide arm 207 to place it at the reference position as described above, the guide arm, which is elevated above the reference position with the guide pin 207a thereof placed on the projection 205d, produces a counter force. Thus the guide pin 207a compresses the projection 205d forward while it enters in the tapered back of the projection 205d, until it finally moves to the reference position, namely, to the rear end of the lower horizontal portion 205c. As the result, since the lift-and-drop eject plate 204 is pushed forward, the intermittent gear 202 engaging therewith is rotated counterclockwise to a position where the ejection end 202E is slightly apart from the connection gear 201. Therefore, the teeth of the intermittent gear 202 do not contact the connection gear 201 which is still continuously rotated.

At that time, since the intermittent gear 202 does not apply any force to the connection gear 201 and hence to the connection arm 209, the connection arm 209 is rotated counterclockwise responsively to the counterclockwise rotation of the drive gear 208 due to the friction at the axle 208a and therefore displaces the connection gear 201 to the right (FIG. 20).

It should be noted here that the pull-and-push eject plate 203 remains immovable regardless of the rotation of the intermittent gear 202 because the rack 203a does not engage the gear 202. This means that any load is applied to the pull-and-push eject plate 203 and other members linked thereto. Thus, according to the third embodiment, the intermittent gear is rotated to provide a predetermined distance from the drive gear without use of a spring, thereby excluding the excessive load to various members due to the strong spring which is indispensable in the prior art loading and ejection mechanism.

(6) Start of Ejection . . . FIG. 21:

With a command for ejection, the drive gear 208 which has been rotated counterclockwise starts rotating clockwise. The connection arm 209 is rotated clockwise due to the friction force at the axle 208a to displace the connection gear 201 into engagement with the ejection end 202E of the intermittent gear 202. Therefore, the intermittent gear 202 is rotated clockwise, contrary to the state during loading. Thus the upper and lower eject plate 203 and 204 engaging the inversion gear 202b of the intermittent gear 202 are also moved rearward, contrary to the mode during loading.

(7) Ejection . . . FIGS. 17 and 18:

With the withdrawal of the lift-and-drop eject plate 204, the guide pin 207a is moved within the tapered cam 205 from the lower horizontal portion 205c toward the upper end against the downward biasing energy of the spring. Therefore, the guide arm 207 starts to move up (FIG. 18).

After the guide arm 207 is fully elevated and fixed to its upper stable position, the lift-and-drop eject plate 204 stops, with the rack 204a thereof being disengaged from the intermittent gear 202 (FIG. 17).

(8) Completion of Ejection . . . FIGS. 15 and 16:

With a further rotation of the connection gear 201, conveying the pull-and-push eject plate 203 rearward, the eject arm is rotated counterclockwise so that the pack stopper formed thereon ejects the cassette out of the pack guide.

Concurrently, the motor stops and the other respective members resume the positions of FIG. 15.

The compression means employed in the third embodiment comprises the projection formed at the lower horizontal portion of the tapered cam and the tapered concavity at the back of the projection. However, this may be replaced by an otherwise selected projection, concavity, tapered edge, etc. or any combination thereof.

The two eject plates may be replaced by a single eject plate so that the single eject plate effects both the sucking and ejecting operation and the lifting and dropping operation.

The rack to link the eject plate with the intermittent gear may be replaced by a cam formed on the intermittent gear to engage the eject plate.

EFFECTS OF THE INVENTION

As described above, the present invention provides a loading and ejection mechanism which is small-scaled and simplified, provides a large movement stroke of the eject plates and reduces the torque of the motor, with a simple construction where the intermittent gear moves the eject plates parallelly back and forth by engagement with the racks formed on the eject plates.

The embodiments of the invention in which an exclusive property or privilege is claimed are defined as follows:

1. A loading and ejection mechanism in a motor driven tape player comprising:
   an eject plate movable between ejecting and loading positions and having a rack thereon;
   an inversion gear engageable with said rack;
   bidirectional drive means for selectively driving said inversion gear in either direction according to the direction of rotation of said motor;
   a movable guide arm for elevating and dropping a pack guide;
   first camming means for coupling said eject plate and said guide arm so as to elevate and drop said pack guide responsively to movement of said eject plate; and a pivotally mounted eject arm linked to said eject plate so as to pivot responsively to a reciprocating movement of said eject plate for reciprocatingly moving a pack stopper, said bidirectional drive means including an intermittent gear coaxially affixed to said inversion gear, a gear train coupled to be drivable in either direction by said motor and having at least a terminal gear thereof mounted on a rotatable gear carriage, and friction drag means for urging said carriage to opposite extreme positions thereof according to the direction of rotation of said motor, said intermittent gear and said carriage being disposed so that during a loading cycle with said motor running in a loading direction said terminal gear engagingly drives said intermittent gear to actuate said system through a loading cycle to present an un-toothed portion to said terminal gear so as to disengage therefrom at the end of said loading cycle, said bidirectional drive means further including resiliently biased camming means coupled to urge said intermittent gear to maintain this disengaging orientation, said friction drag means rotating said carriage means to carry said terminal gear into re-engagement with said intermittent gear upon reversal of said motor to run in an ejecting direction.

2. A loading and ejection mechanism for a tape player having motor drive means, a pack guide operable between a raised position for accepting a cassette and a lowered position to seat said cassette so as to engage said motor drive means, and a pivotally mounted guide arm coupled to said pack guide and operable between a first position holding said pack guide in said raised portion and a second position holding said pack guide in said lowered position, said mechanism comprising:

drive gear means driven by said motor drive means;

an intermittent gear engageable with said drive gear means over a restricted range of angular orientations;

an eject plate coupled to rotation of said intermittent gear so that a movement of either one of said eject plate and said intermittent gear moves the other;

camming means for coupling said guide arm to said eject plate;

biasing means for biasing said guide arm towards said first position thereof;

means for engaging said drive gear means to said intermittent gear during a loading operation so that said eject plate is driven in a given direction by said intermittent gear and said guide arm is urged towards said second position, said camming means being configured so that during a terminal portion of the movement of said guide arm to said second position said biasing means and said camming means urge said eject plate in said given direction to urge said intermittent gear to a disengaging orientation with respect to said drive gear means.

* * * * *